United States Patent [19]

Kresge et al.

[11] Patent Number: 4,822,545
[45] Date of Patent: * Apr. 18, 1989

[54] METHOD FOR MAKING FREE-FLOWING COATED RUBBER PELLETS

[75] Inventors: Edward N. Kresge, Watchung; Donald R. Hazelton, Chatham Township, Morris County, both of N.J.

[73] Assignee: Exxon Research & Engineering Company, Florham Park, N.J.

[*] Notice: The portion of the term of this patent subsequent to Nov. 11, 2003 has been disclaimed.

[21] Appl. No.: 929,550

[22] Filed: Nov. 10, 1986

Related U.S. Application Data

[63] Continuation of Ser. No. 696,726, Jan. 31, 1985, Pat. No. 4,622,193, which is a continuation-in-part of Ser. No. 621,179, Jun. 15, 1984, abandoned.

[51] Int. Cl.[4] ................................................. B29B 9/06
[52] U.S. Cl. .................................... 264/141; 428/407; 525/210; 525/240
[58] Field of Search ................................ 264/141, 142

[56] References Cited

U.S. PATENT DOCUMENTS 3,949,039  4/1976  Yamamoto et al. ................. 264/142
4,454,092  6/1984  Shimizu et al. ..................... 264/141

Primary Examiner—Jacob Ziegler

[57] ABSTRACT

Free flowing coated pellets are prepared by blending a first polymer with a second polymer wherein the second polymer is a polymer which has a crystalline or semicrystalline melting point which is at least 10° C. above the melting or softening point of the first polymer, the two polymers being insoluble in one another in the melt state; (2) intimately blending the two polymers; and (3) extruding the blend through a die having an outlet die face which is maintained at a substantially lower temperature than the extruder melt temperature.

In its preferred embodiment the first polymer is an elastomer and the second polymer comprises at least one crystalline or semi-crystalline plastic polymer. A typical composition comprises an EMP or EPDM rubber and a mixture of polyethylene and a crystalline copolymer of ethylene and propylene.

1 Claim, 2 Drawing Sheets

Figure 1A- Scanning Electron Microscope (SEM) micrograph of strand-cut pellet sections microtomed at liquid nitrogen temperatures.

Figure 1B- Scanning Electron Microscope (SEM) micrograph of under-water pellet sections microtomed at liquid nitrogen temperatures.

Figure 2A- SEM of surface of strand-cut pellet section microtomed at liquid nitrogen temperatures showing rubber extracted from the surface.

Figure 2B- SEM of surface of under-water pelletized pellet section microtomed at liquid nitrogen temperatures showing continuous thermoplastic skin with no rubber extracted.

METHOD FOR MAKING FREE-FLOWING COATED RUBBER PELLETS

CROSS REFERENCE TO RELATED APPLICATIONS

This is a division, of application Ser. No. 696,726, filed Jan. 31. 1985, now U.S. Pat. No. 4,622,193, granted Nov. 11, 1986, which is a continuation-in-part of U.S. Patent Application Ser. No. 621,179 filed June 15, 1984, now abandoned.

BACKGROUND OF THE INVENTION

Many elastomers are tacky or exhibit cold flow in their green or uncured state. As a consequence, these materials cannot be transported in bulk as free flowing pellets but must be shipped in bales. This practice requires that the ultimate elastomer processor must be equipped to cut up or mill the bales. The necessary equipment is generally large scale, expensive equipment. Additionally, the bales cannot be readily pre-blended with other materials. The necessity for baling results in high handling and shipping costs. In order to facilitate handling and processing of elastomers, it has been considered desirable to produce elastomer pellets. Generally, however, elastomer pellets exhibit "blocking" or cold flow characteristics which result in solidification into a solid mass after a short storage time, especially at warm temperatures.

Numerous attempts have been made to formulate elastomeric pellets which will remain free flowing until they are to be processed. Dusting the elastomeric pellets with inorganic materials, e.g., clay, talc, etc., has been found to extend the time over which the pellets are free flowing. Improved results have been achieved by dusting a coating with selected organic materials such as hydrocarbon waxes (British Pat. No. 901,664) or powdered polyethylenes and polypropylenes (British Pat. No. 928,120). However, because of the discontinuity of the dust coat, the coated pellets eventually flow together to form a solid mass.

By blending the elastomer wiht a crystalline type polymer such as polethylene, polypropylene or copolymers of ethylene and propylene, it has been possible to produce free flowing elastomer containing pellets. However, the elastomer content of the pellet must be less than about 65%. The product is, of course, not suitable for use in all elastomer applications.

Another coating approach to the problem has been the coating of elastomer pellets with emulsions containing a tack free coating material. Coating is accomplished either by dipping pellets into the emulation or spraying the emulsion onto the pellets. In either case the emulsion coating must be dried, and where the emulsion contains a solvent the solvent must be recovered. Drying and solvent recovery requirements result in increased costs.

Melt-coating methods for producing free-flowing elastomer pellets have also been suggested. According to U.S. Pat. No. 3,669,772 to Bishop, coating can be accomplished by using a die, similar to wire coating die, into which a strand of rubber to be coated is fed simultaneous with melt coating material. A continuous melt coated strand of rubber issues from the extrusion die outlet, is cooled in a liquid cooling bath, and is subsequently pelletized. This melt-coating method not only adds significantly to rubber manufacturing costs, but has limitations from the standpoint of efficiently producing large quantities of coated pellets.

Pellets of rubber have been coated with various coating materials by heating the rubber pellet to a temperature which is higher than the melting point of the coating materials, and then contacting the heated pellet with the coating material which is preferably in the form of a fine powder. The heated pellet fluxes the coating material on the surface of the pellet to form a substantially continuous coating. The hot coated pellet is then cooled.

A study of bicomponent mixtures has shown that upon extrusion of the mixtures, stratification will occur. See Soulborn, J. H. and Ballman, R. L.; "Stratified Bicomponent Flow of Polymer Melts in a Tube", Applied Polymer Science, No. 20, 175-189 (1973). The authors attribute stratification to differences in the melt viscosity of the components.

What is required by the art is a commercially viable method of producing a free flowing rubber pellet which contains a major portion of rubber. To be commercially viable, the process for producing the free flowing pellets must be readily adapted to conventional rubber pelletizing techniques.

SUMMARY OF THE INVENTION

It has surprisingly been found that a rubber pellet composition comprising an elastomer and plastic insoluble in the elastomer can be caused to coat itself with a plastic skin by control of composition, extrusion conditions and die temperature. The elastomer-plastic blend is extruded at a temperature above the melting point of the plastic, and pelletized as it exits from a die, the die having a temperature gradient across the die from inlet to outlet, the gradient being such that the die outlet temperature is substantially lower than the extrusion melt temperature (die inlet temperature). The resultant product is a pellet coated with a skin of plastic.

DETAILED DESCRIPTION

Figure 1A:
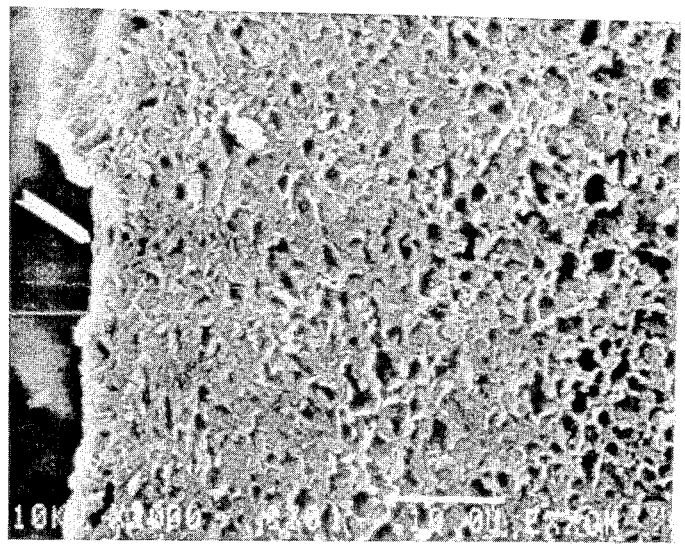
FIG. 1A—Scanning Electron Microscope (SEM) micrograph of strand-cut pellet sections microtomed at liquid nitrogen temperatures.

This invention relates to a method for preparing a free flowing elastomer pellet. More particularly, it relates to a method for preparing an elastomer pellet which is free flowing by virtue of the fact that it is encased in a skin comprising a solid plastic material.

In the practice of this invention an elastomer is blended with a semi crystalline or crystalline plastic material which has a melting point of at least 10° C. higher than the softening point of the elastomer, preferably at least about 15° C. than the softening point of the elastomer, preferably at least 30° C., more preferably at least 40° C. The elastomer/plastic blend is then extruded through a die in which the die outlet is maintained at least 10° C. below the melting point of the plastic in order to develop a temperature gradient across the die from die inlet to die outlet, preferably at least 20° C., more preferably at least about 30° C. below the melting point of the plastic.

Not wishing to be bound by theory, it is believed that as the melt temperature is reduced across the die, the difference in viscosity between the elastomer and the plastic is increaseed thereby causing stratification in a manner so as to cuase the plastic to be concentrated along the surface of the die orifice while the central core becomes elastomer rich. Shear plays an important part in the stratification process as does the wall effect because of their effect on the velocity profile of the two components of the melt, and hence, the composition differences throughout the melt exiting the die. The melting point of the polymer is a function of shear and pressure, and is higher in the dynamic system of an extruder die than the static melting point of the polymer. As used in the specification and claims, "melting point" will mean the normal static melting point or softening point of the polymer.

The elastomer/plastic polymer composition is extruded through a multi-orificed strand die in the afore-described manner and pelletized either by use of a strand pelletizer or by using a die face pelletizer. In one embodiment a conventional strand die is modified by having the die outlet plate cored so that it can be water cooled. In a preferred embodiment the die cooling is accomplished by using an underwater pelletizer. Typical of these underwater pelletizers is the mini underwater pelletizer (MUP) manufactured by Gala Industries, Inc., Eagle Rock, VA.

Since the stratification proces by which a pellet coated with a skin of plastic is formed requires a finite time the L/D ratio of the die outlet holes is an important criterion in carrying out the process of this invention. The L/D ratio can be about 2 to about 20, preferably about 2.5 to about 12, more preferably about 3 to about 10, e.g., about 3.5 to about 8. The die outlets through which strands of elastomer/plastic blends are extruded can be converging tubular outlets which have a larger diameter inlet than outlet. In that event, the L/D ratio is based on an average outlet diameter over the length of the channel.

The length of the outlet channel can be about 1 inch to about 4 inches, preferably about 1.5 to about 3.5 inches, more preferably about 2.0 to about 3.0 inches, e.g., about 2.5 inches. The diameter of the die outlet orifice can be about 0.05 to about 0.200 inches, preferably about 0.075 to about 0.150 inches, e.g., about 0.125 inches.

A critical parameter in carrying out the process of this invention is the temperature gradient across the die from the inlet to the outlet. While no particular temperature gradient is required, at some point within the die the melt temperature must be reduced to a temperature which is preferably at about the melting point of the plastic in order to insure that there is a significant difference between the viscosity of the plastic melt and the viscosity of the elastomer melt. It is not essential that the melt temperature of the composition be below that of the plastic melt point. In a preferred embodiment, however, the melt temperature of the composition is reduced to a temperature which is below the melting point of the plastic component. In the preferred method of carrying out the process of this invention, an underwater pelletizer is used and the temperature gradient across the die is created by cooling the face of the die.

The maximum temperature differential across the die is achieved by operating at or about the plugging temperature of the system. The "plugging temperature" is that temperature at which some of the die outlet orifices begin to be plugged by solidified polymer. Some plugging of a multi-orifice die can be tolerated up to the point where flow rate is decreased below economical rates. Generally, the outer outlet holes in the die will plug first. A multi-orifice die will have twenty or more outlet holes, e.g., 50–100. It is possible to operate the die at the plugging temperature with as much as about 20–30% of the holes plugged.

The plugging temperature is determined by gradually cooling the die or die face to the point where outlet hole plugging begins to ccur. Operation at the plugging temperature achieves the maximum stratification and plastic skin development in the elastomer pellet.

Where an underwater pelletizer is used, the cooling water temperature will be about 20° C. to about 50° C. The "extruder melt temperature" (the die inlet melt temperature) will be about 160° C. to about 250° C. and will depend on the elastomer and plastic selected. The appropriate extruder melt temperature for various plastic/elastomer compositions is known to those skilled in the extrusion art.

The process of this invention is particularly suited to those elastomers which are tacky in their solid state or exhibit cold flow. Illustrative, non-limiting examples of the elastomers to which this invention may be applied are high molecular weight elastomers having a Tg of less than 0° C., e.g. ethylene-propylene rubber (EPR), terpolymers of ethylene, propylene and a non-conjugated diene (EPDM), natural rubber, polyisobutylene, butyl rubber, halogenated butyl rubber, arylonitrile-butadiene rubber (NBR) and styrene butadiene rubber (SBR) or mixtures thereof.

The plastics which may be utilized in the practice of this invention have a crystalline melting piont of at least 70° C. Illustrative of those plastic polymers are high density polyethylene (HDPE), low density polyethylene (LDPE), polypropylene (PP), linear low density polyethylene LLDPE, syndiotactic polybutadiene resin (SBD), polybutene-1 and crystalline copolymers of ethylene and other alphaolefins. The plastic and elastomer must be insoluble in one another in the melt state.

The elastomer-plastic polymer composition of this invention can comprise about 15 to about 90 weight percent plastic polymer, e.g., about 20 to about 80 weight percent. Where the product desired is an elastomeric product the plastic polymer comprises about 15 to about 35 weight percent of the composition; preferably about 15 to about 30 weight percent, most preferably about 20 to about 28 weight percent, e.g., about 25 wt.%.

The plastic and polymer may be blended in any conventional manner and fed to an extruder. For example, an elastomer bale can be shredded and blended with plastic polymer powder in a ribbon blender and subsequently fed to an extruder. Preferably a mixing extruder, e.g., twin screw extruder is used for the extrusion to insure complete mixing of the elastomer and plastic. The mixture is extruded out of a conventional multi-orificed die in which the die face is maintained at a temperature of at least about 10° C. below the melting point of the plastic polymer. Preferably the die face is maintained at a temperature at least about 10° C. below the melting point of the plastic polymer; more preferably at least about 20° C.; most preferably at least about 30° C. below the melting point of the plastic. Of course, in view of the high melt temperature of the polymers the entire die plate cannot be maintained at a single temperature, and there will be a temperature gradient across the die from its internal inlet surface to its outer face at the outlet of the die.

To demonstrate the effectiveness of the instant invention, an elastomer-plastic polymer composition having the formulation shown in Table I was extruded through a conventional multi-orificed strand die and cooled by passing the polymer strands through a water bath. Subsequently, the strands were pelletized. Additionally the same formulation was pelletized using an underwater pelletizer.

The underwater cut pellets had a plastic skin, a lower coefficient of friction and were more free flowing than the conventional strand pelletized material. Table II compares the coefficient of friction of the two products, and Table III shows the pressure/strength ratio for the compositions. The pressure/strength ratio is the ratio of the consolidation pressure to yield strength under the shear required to create pellet flow. A higher ratio is indicative of a more free flowing pellet.

TABLE 1

| Elastomer/Plastic Composition |
| --- |
| Elastomer[1]: 40% by weight |
| Plastic Polymers |
| HDPE[2] 16% by weight |
| Polypropylene[3] 44% by weight |

[1] An ethylene propylene copolymer containing 43% ethylene, having a glass transition temperature of 55° C., and having a mooney viscosity of 25 (1 + 8 at 127° C.).
[2] AB 55-100; a 10 melt index HDPE polymer.
[3] An isotactict polypropylene reactor copolymer of propylene and ethylene having a crystalline melt temperature of 160° C.

TABLE II

| Process | Wall Friction Angle Stainless Steel | (Degrees) Aged Carbon Steel |
| --- | --- | --- |
| A Conventional strand cut | 22 | 22 |
| B Underwater cut (skin) | 13 | 18 |

TABLE III

| Process | Consolidating Pressure (psi) | Yield Strength (psf) | Pressure/ Strength ratio |
| --- | --- | --- | --- |
| A | 386 | 135 | 2.49 |
| B | 272 | 18 | 15.1 |

In preparing the underwater die cut pellets of this invention, the MUP was operated with an extruder melt temperature of 408° F., an extruder pressure of 1600 psi and cooling water temperature of 105° F. The extruder output rate was 125 lbs/hr.

Figure 1B:
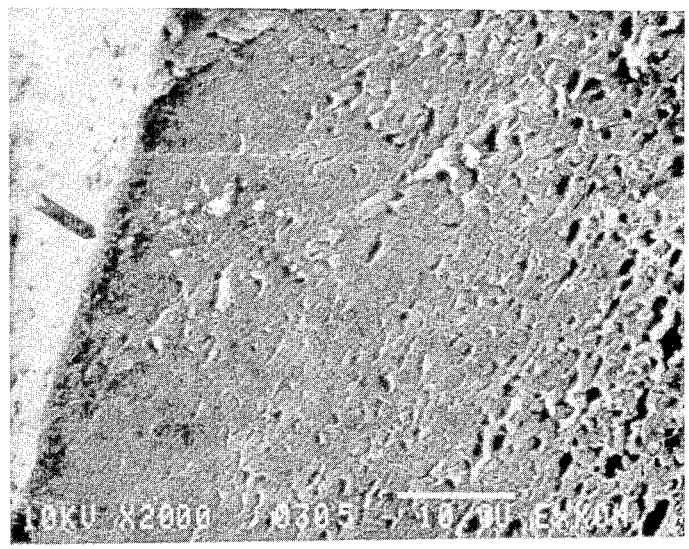
FIG. 1B—SEM micrograph of under-water pelletized pellet sections microtomed at liquid nitrogen temperature.

It is evident from the above data that pellets made according to the process of this invention are more free flowing than strand pelletized material even where the compositions are identical. FIG. 1A and B are SEM micrograph comparisons of the strand formed pellets (FIG. 1A) and the underwater cut pellets (FIG. 1B). The rubber phase of the composition was extracted with hexane. As can be seen from the micrograph of FIG. 1B, the product produced according to the process of this invention has a skin which is substantially all plastic polymer while the pelletized strands are essentially of uniform composition throughout.

Figure 2A:
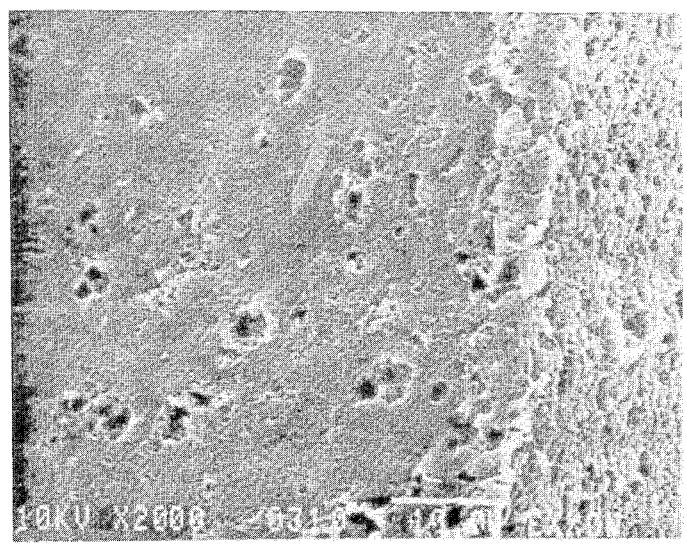
FIG. 2A—SEM of surface of strand-cut pellet section microtomed at liquid nitrogen temperatures showing rubber extracted from the surface.
Figure 2B:
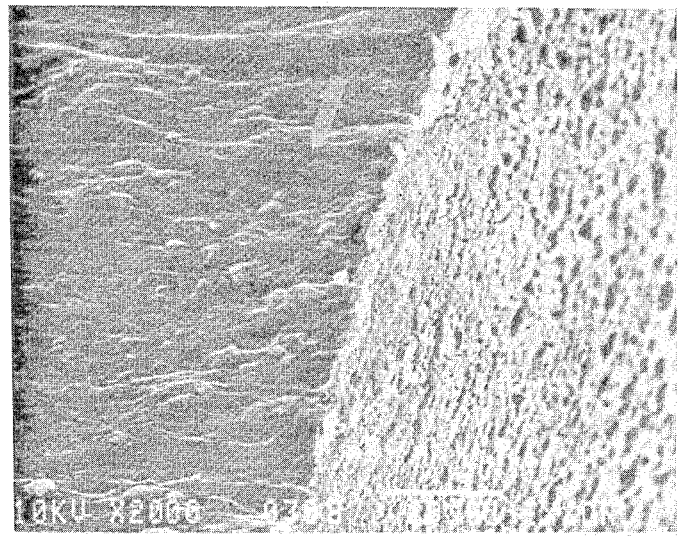
FIG. 2B—SEM of surface of under-water pelletized pellet section microtomed at liquid nitrogen temperatures showing continuous thermoplastic skin with no rubber extracted.

In order to demonstrate that the skin of the pellets of this invention are substantially all plastic polymer, the pellets were treated with hexane to extract the rubber phase. A comparision of FIGS. 2A and 2B show that rubber was extracted from the surface of the conventional strand pelletized material, whereas substantially no rubber was extracted from the sking of the pellets prepared according to the process of this invention.

What is claimed is:

1. A process for preparing a free flowing polymer pellet which comprises:

(a) intimately mixing an elastomeric butyl rubber polymer or a mixture of butyl rubber and ethylene-propylene rubber, ethylene, propylene and a non-conjugated diene, natural rubber, polyisobutylene, halobutyl rubber or styrene butadiene rubber, having a glass transition temperature (Tg) of less than 0° C. with a plastic polymer having a semicrystalline or crystalline melting point of at least 10° C. higher than the softening point of the elastomer; said plastic polymer and elastomeric polymer being insoluble in one another in the melt state;

(b) extruding the elastomer/plastic polymer mixture at an extrusion melt temperature above the melting point of the plastic, through a die having a die inlet and a die face said die face being the die outlet; maintaining a temperature gradient across the die from the die inlet to the die outlet, said temperature gradient being such that the polymer mixture has a melt temperature at the die outlet which is less than the extrusion melt temperature; and (c) forming pellets of the extrudate, thereby forming a pellet having a skin comprising the plastic polymer.

* * * * *